United States Patent [19]
Bennett et al.

[11] Patent Number: 5,132,841
[45] Date of Patent: Jul. 21, 1992

[54] RIBBED REFLECTOR

[76] Inventors: Reginald B. Bennett, 3103 Seneca Dr., Oakville, Ontario, Canada, L4L 1B1; Reginald S. Bennett, P.O. Box 247, Station 'F', Toronto, Ontario, Canada, M4Y 2L5

[21] Appl. No.: 627,744

[22] Filed: Dec. 14, 1990

[51] Int. Cl.⁵ .............................................. G02B 5/122
[52] U.S. Cl. ..................................... 359/529; 359/515; 359/530
[58] Field of Search ................ 359/515, 527, 530, 546

[56] References Cited

U.S. PATENT DOCUMENTS

| | | | |
|---|---|---|---|
| 4,202,600 | 5/1980 | Burke et al. | 359/530 |
| 4,573,763 | 3/1986 | Thomas | 359/515 |
| 4,712,867 | 12/1987 | Malek | 359/530 |
| 5,022,739 | 6/1991 | Bennett et al. | 359/529 |

Primary Examiner—Loha Ben

[57] ABSTRACT

A reflectant surface of retro reflective material comprises a plurality of parallel convex outward ribs having a center-to-center spacing of between ⅜" and 1/16". The retro reflective surface preferably employs an arrangement of triads mutually perpendicular surfaces, which triads and surfaces are indistinguishable at normal minimum viewing distances.

17 Claims, 3 Drawing Sheets

FIG. 1.
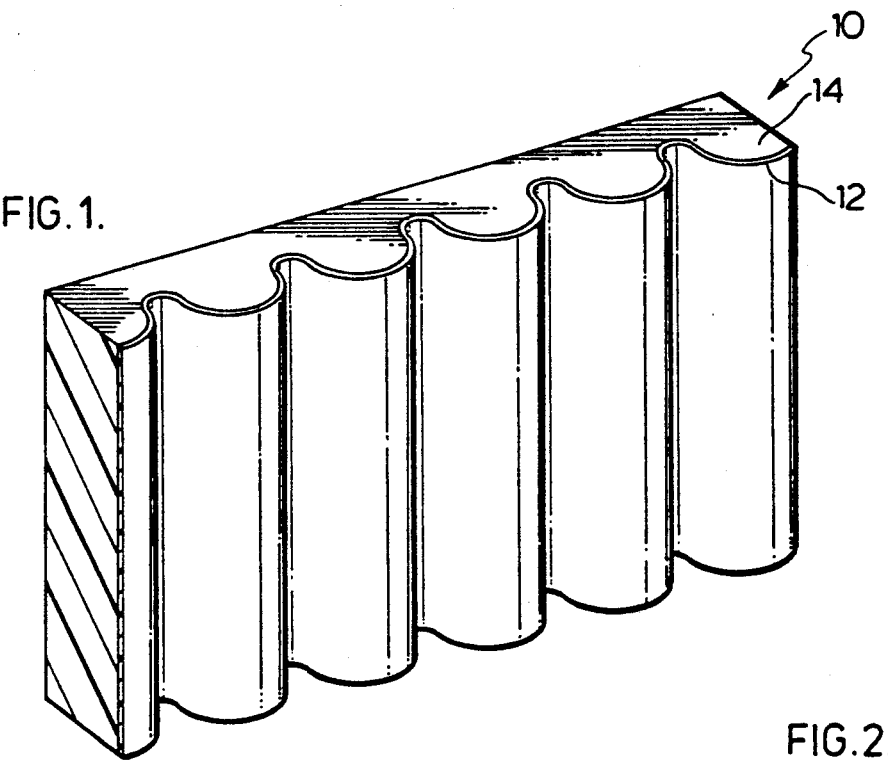
FIG. 2.
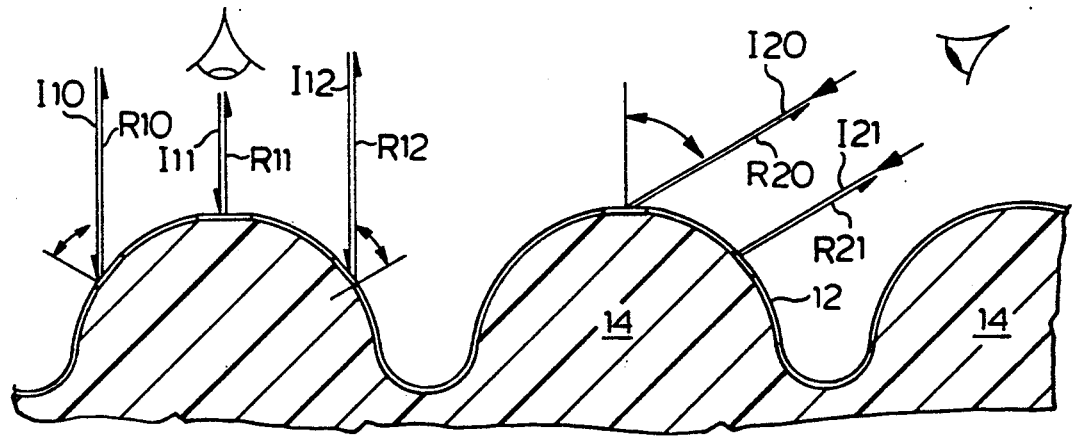
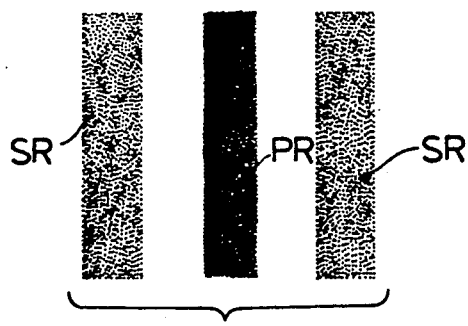
FIG. 3.

RIBBED REFLECTOR

FIELD OF THE INVENTION

This invention relates to a novel reflectant surface for use in applications where it is desired that an object or information be visible by retroreflected light. By 'retroreflected light' I means light originating from a source adjacent the viewer, reflected back to him.

DESCRIPTION OF THE INCORPORATION ART

The invention preferably makes use of surfaces made up of cube corner reflectors as described in the following U.S. Pat. Nos.:

| | |
|---|---|
| 2,380,447 | Jungerson |
| 3,712,706 | Stamm |
| 3,684,348 | Rowland |
| 3,810,804 | Rowland |
| 4,025,159 | McGrath |
| 4,202,600 | Burke, et al. |

The teachings of the above patents are incorporated herein by reference.

In particular the invention preferably makes use of cube corner reflective sheeting as described in the Burke U.S. Pat. No. 4,202,600 where regular arrays of cube corner sheets are arrayed in zones (indistinguishable to the user) oriented relative to adjacent zones in such a way that retroreflective intensity variation with azimuthal angle is reduced at high angles of incidence to the normal to the sheet.

By an array is meant an ordered group of cube corner triads. A 'zone' is the area occupied by such an array.

SUMMARY OF THE INVENTION

The invention takes advantage of the fact that retroreflectant material composed of arrays of cube corner reflectors (which are not individually distinguishable at minimum expected viewing distances) customarily retroreflect incident light more strongly at a normal angle of incidence and at an angle of incidence at 60° to the normal than at angles in between. It is sometimes convenient herein to refer to retroreflection along the normal as primary reflection and retroreflection at 60° to the normal as a secondary reflection.

The invention provides a retroreflector made up of a series of convex outward parallel ribs, the ribs having a center-to-center spacing of between ⅜" and 1/16". The parallel ribs may, depending on the function, be arranged with the parallel ribs in flat or curved array. A curved array will customarily be curved as viewed along the axis of the ribs since curvature in other directions will be difficult to achieve with economical methods of construction. With a straight rib of a retroreflector in accord with the invention it will be noted that for an incident beam of light from an intended viewer there will be a line of primary retroreflected light along that line of the rib which is perpendicular to the incident direction. It is noted however that with the convex rib, the incident light will also strike a line of surface on one or both sides of the primary retroreflected line where the surface of the convex rib is at 60° to the incident ray so that some of the cube corner retroreflectors will secondarily retroreflect the incident ray. Thus with each convex rib the viewer will see two and sometimes three lines of light (collectively referred to as 'doublets' or 'triplets' herein). (With three lines of light the viewer is seeing a central, primary retroreflection line with a secondary retroreflection line on each side). With a plurality of ribs such reflection can collectively provide a striking reflective effect.

The primary retroreflected rays will be available where arrays of cube corner triads (three faces combined at a cube corner to produce the retroreflective effect), are arranged in random array or, as is preferred, in zones where the triads in each zone are at 30° to the triads in an adjacent zone. In this way the cube corner reflector material will, although randomly oriented relative to the direction of the ribs, supply at the secondary line locations sufficient cube faces to produce a line of striking intensity which has a relatively small variation with the azimuthal angle of the incident ray to the normal to the panel at the point of incidence.

The shape of the rib is a continuous convex outward curve. This will, for a wide range of angles, produce the primary and a secondary reflective line and for a smaller range of angles produce a primary and two secondary reflective lines.

The dimensional limits of the reflector in accord with the invention are set by the fact that, for centre to centre rib spacing of greater than ⅜", it is believed that the lines form too small a proportion of the reflector area to be effective, while rib spacings of less than 1/16" are difficult to achieve due to difficulties in handling the preferred reflective material.

It is noted that with all cube corner reflector arrays there is some directivity in the strength of the secondary reflection. That is for a given array zone the secondary reflection will be stronger in some azimuthal directions relative to the normal than others. This is of course more noticeable with a single array where all triads have an ordered orientation relative to each other. It will also be noted that the cube corner reflector array zones which are taught by U.S. Pat. No. 4,202,600 and preferred for use with the invention, are too small for resolution by the viewer so that the actual orientation of individual zones of the reflecting surface is not known when a sheet bearing the reflectant coating is applied. Thus it is preferable if the cube corner reflector sheet is divided into zones (indistinguishable at usual viewing distances) which are differently oriented relative to each other tending to give a more uniform reflection at large angles to the normal and at varying azimuthal angles about the normal.

Preferably the cube corner cavity material is that sold under the trade mark REFLEXITE, a product of the Reflexite Corporation of New Britain, Conn. In such product the cube corner cavities are arranged in windows formed by triads of mutually perpendicular cube faces in an ordered array with a predetermined orientation. Such ordered arrays are in zones small enough to be indistinguishable to the viewer at minimum normal viewing distances. The zones preferably have two orientations at 90° to each other arranged in a checkerboard or other pattern. The characteristics of the ordered array is to give stronger secondary reflections at 60° angular azimuth intervals and the result is that the 90° rotation between adjacent zones achieves an effective 30° rotation giving stronger azimuthal reflectivity at 30° intervals but relatively similar reflection intensity at angles in between.

DESCRIPTION OF THE DRAWINGS

In drawings which illustrate a preferred embodiment of the invention:

FIG. 1 shows a reflector in accord with the invention,

FIG. 2 is an enlarged sectional view of a pair of corrugations in accord with the invention, showing the reflections achieved, FIG. 3 is a plan view of the ribs of FIG. 2 showing reflective lines.

PREFERRED EMBODIMENT

Figure 4:
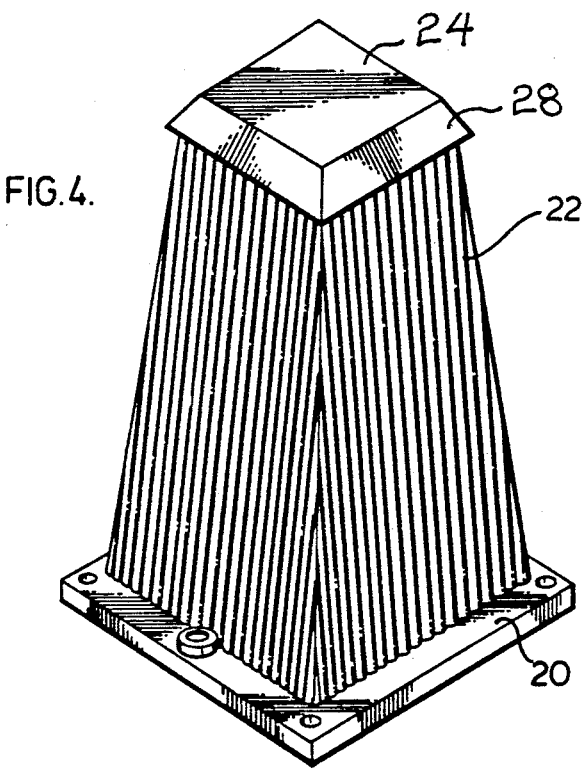
FIG. 4 shows a reflecting pylon using the reflector of the invention.

In the drawings the reflector comprises a molded plastic backing 10 with a reflectant cover layer 12. The plastic backing provides rounded convex outward ribs 14 shaped to form the similar shape in the reflectant covering layer 12. The backing 10 may be wood, metal or other material but molded plastic is preferred.

The reflectant material is an array or arrays of cube corner reflectors preferably having arranged in zones of random orientation or preferably in square or triangular zones perpendicular to each other as taught by U.S. Pat. No. 3,712,706 whose contents are included herein by reference. The zones as taught in the patent and the arrays themselves are small enough so that they cannot be distinguished by an observer at normal minimum viewing distances.

In FIG. 2 parts of three of the ribs are shown in section to demonstrate the phenomena used. In FIG. 2 three parallel incident rays I 10, I 11 and I 12 are shown perpendicular to the median plane of the corrugated panel. The rays (along with the complete bundle of rays not shown) may be thought of as emanating from a single source for example a searchlight on a helicopter or aircraft. By 'aircraft' I mean a fixed wing aircraft. The central reflected ray I 11 meets the rib normal to the rib contour and produces the stronger retroreflected ray R11. The result is a strong primary reflection line PR running the length of the corrugation (along the peak) and, given slight differences in angle of the rays and slight variations in the cube corner reflecting material, the line is of material width with fuzzy boundaries rather than being optically or geometrically thin.

Rays I 10 and I 12 (parallel to I 11) strike the surface at an angle of 60° to the normal to the rib surface and are respectively retroreflected as rays R10 and R12 to a viewer near the source. The phenomena take place along the length of the corrugation and two secondary reflection lines SR of material width are produced. The rays between R11 and R10 and R11 and R12, or outside R10 and R12 are retroreflected with less intensity thus the lines formed by rays in the direction R10, R11, R12 stand out against a less bright background and form a triplet of lines attracting the viewer's (located near the light source, attention). This triplet occurs on each of the ribs.

For a source at a different location I 20 and I 21 represent parallel rays incident on the rib. Incident ray I 21 strikes the corrugation normal to its surface, at that point and is strongly retroreflected. The primary retroreflection shown corresponds to a line not shown but similar to PR running the length of the corrugation (assuming that there are approximately parallel rays from the source along the corrugation length). Ray I 20 will strike the corrugation at 60° to the normal to the median plane of the corrugated panel at the point of incidence producing, on each corrugation, a line of secondary reflection not shown but similar in appearance to line SR. No line is formed on the other side of I 21 from I 20 since the corrugation would not have the required contour and the ray in any event would be masked by the next contour. Thus a doublet is formed by the lines of rays corresponding to R-20 and R-21 for the viewer at the source of I 20 and I 21 but these lines formed by R 20 and R 21 attract the viewer's attention.

It will be noted that a source of light moving past the rib will produce, first a moving doublet of lines on each corrugation, then, in the vicinity of the normal to the corrugation's median plane, a moving triplet and past this, a moving doublet again.

FIG. 4 shows a pylon having a base 20 having, a number (here four) sloping side panels 22 and a top 24. The sides if used for landing aircraft will typically have a slope of 3°-6° to the vertical and if used for landing helicopters a slope of 8° to 10° to the vertical, the slope in each case corresponding to the desired landing angle for an aircraft or helicopter relative to the horizontal. Such pylons are described in copending application Ser. No. 07/617,766 filed Aug. 9, 1991, a continuation-in-part-of application Ser. No. 07/507,840 filed Apr. 12, 1990 which was a continuation-in-part of application Ser. No. 07/469,376 filed Jan. 24, 1990. As stated in that application the pylon will preferably be symmetrical about a vertical axis and may be constructed as a permanently formed unit or may be formed in a foldable blank which may be erected for use and unfolded for storage. The top is preferably covered with cube corner, retroreflector material to provide a reflector to aircraft or helicopters flying overhead.

In distinction to the disclosure of co-pending application, Ser. No. 507,840, the panels 22 are covered with the ribbed reflector having contours as in the reflector of FIG. 1. The ribs on the pylon panel preferably run vertically and provide the striking reflective line pattern described when retroreflecting light therefrom. The visibility of the pattern is enhanced by having the corrugations run in the longitudinal direction of the panel. If desired, the corrugations may be arranged to run horizontally or diagonally.

As shown in FIG. 4 the pylon includes upper panels 28 between side panels 22 and top panel 24. The upper panels 28 are preferably covered with differently colored retroreflectant material to panels 22 and 24 and are arranged to slope at about 45° to the horizontal in the intended attitude of the pylon. As shown the panels are much longer in then horizontal than in their sloping direction to form an artificial horizon for a pilot.

The upper (about) 45° panels 28 may form an overhang as shown or may slope from the outer periphery of top panel 24 to the top edges of side panels 22 to give a shape to the pylon more suitable for nesting.

The artificial horizon formed by the upper surfaces 28 is particularly useful for helicopters in landing and taking off as now explained.

A critical point in flying a helicopter is the arrival or departure from site. During this operation a certain portion of time is spent in the hover mode. Whilst in this position it is essential that the pilot have access to a horizontal reference datum to present the possibility of dynamic roll-over. To this end the bevelled upper surfaces 28 of the pylon have been designed to provide a horizontal band of alternatively colored retroreflective material. The choice of angle for this feature is 45° which ensures that the pilot is not blinded by reflection.

Figure 5:
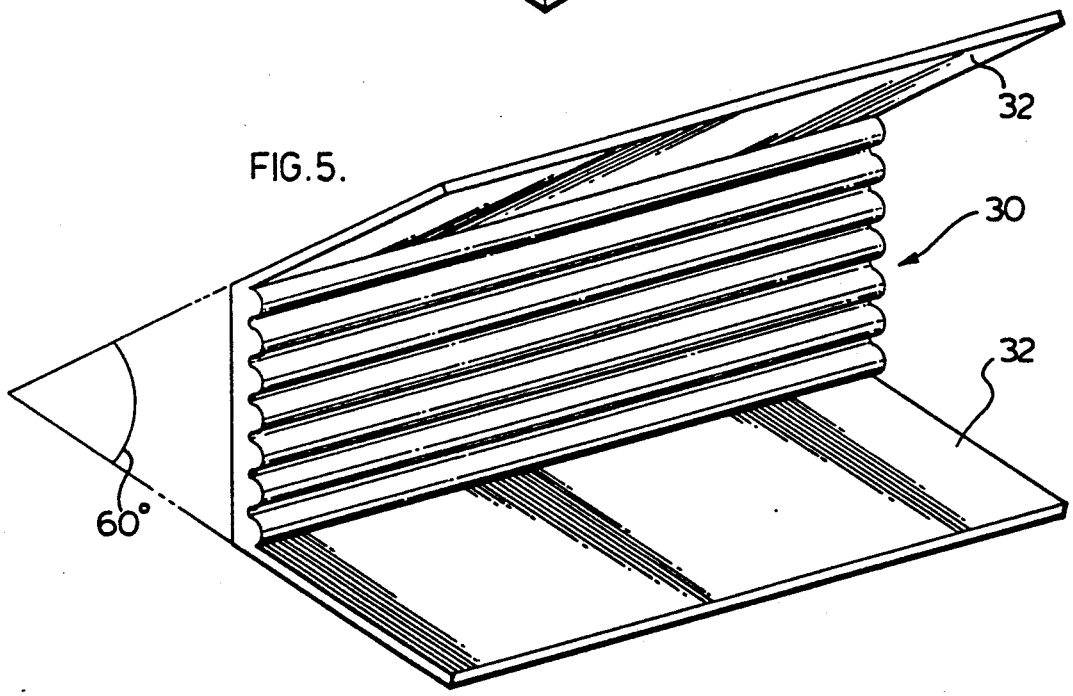
FIG. 5 shows an angled reflector using the reflector of the invention.

FIG. 5 shows a reflector wherein a central panel 30 is perpendicular to a desired viewing direction. At each end of the central panel is a divergent plane 32, the divergent planes, making an angle of 60° to each other. The divergent panels 32 are covered with flat retroreflectant material preferably Reflexite as previously described. Such a reflecting device is the subject of our copending application Ser. No. 538,012 filed Jun. 13, 1990 now U.S. Pat. No. 5,022,739. However, the central panel is there disclosed as flat reflexite. The central panel, in accord with the present application, is provided with ribs running parallel to the line of intersection of the two planes. Again the visibility of the pattern is enhanced by having the corrugations run in the long direction. As we have found, when a light is projected approximately along the plane of symmetry through the (imaginary) line of intersection of the planes, (the 'median plane') then a viewer looking approximately along the line of incidence of the light sees relecting areas of approximately equal brightness from the two panels 32. If the light from the viewer is projected from a location on one side or the other of such plane then the corresponding areas on the panels are darker and lighter with the position of the dark side indicating the direction toward which the viewer must change direction to reach the median plane. The device used with the line of intersection extending horizontally, as shown, may be used to indicate the descent path for an aircraft or helicopter and used vertically may indicate such paths as the approach of a vehicle to a loading dock, or, in relevant movement to the viewer alert him to such events as the passage of a freight train on which the device is mounted.

In accord with the invention claimed herein, the central panel is provided with a ribbed reflector with the ribs running parallel to the line of intersection of the angled panels 32. The ribbed reflector with its bright doublet or triplet reflecting lines provides a striking reflection to rivet the viewer's attention.

It is noted that the ribs are continuously curving and convex outwards over each rib. The curve may be semi-cylindric i.e. semi-circular in section but need not be as long as it is continuously curving and convex outward.

The reflectant surface for the ribs, as well as for panel 32 is as previously described an array of cube corner reflectors. Preferably such cube corner reflectors are arranged on a sheet and attached by adhesion to a form which shapes the reflectant layer into the convex outward ribs. Preferably the reflectant layer is that provided by Reflexite Corporation of New Britian, Conn. under the model number AP1000. Other cube corner reflector arrays for rays at 60° to the normal to the median plane of the corrugated panel show a wider variation in retro-reflective intensities for varying azimuthal angles. As explained in U.S. Pat. No. 4,202,600 it is possible to arrange small zones of regular arrays of cube corner reflectors so that each zone is at an angle of 90° to adjacent zones (but effectively at 30° since the regular array has 60° symmetry). It is preferred to use cube corner reflectant material arranged in this way since less variation with azimuthal angle is encountered in the retro-reflection at 60° to the normal, to the median plane of the corrugated panel. The pattern of each array zone and the zones themselves are made too small to be distinguishable at normal, minimum viewing distances.

Thus, it is preferred to use Reflexite, a product of Reflexite Corporation, of New Britain, Conn. and, of their products preferred to use their Reflexite model number AP1000 as embodying the use of cube corner array zones at 90° to adjacent zones as described in the preceding paragraph.

Figure 6:
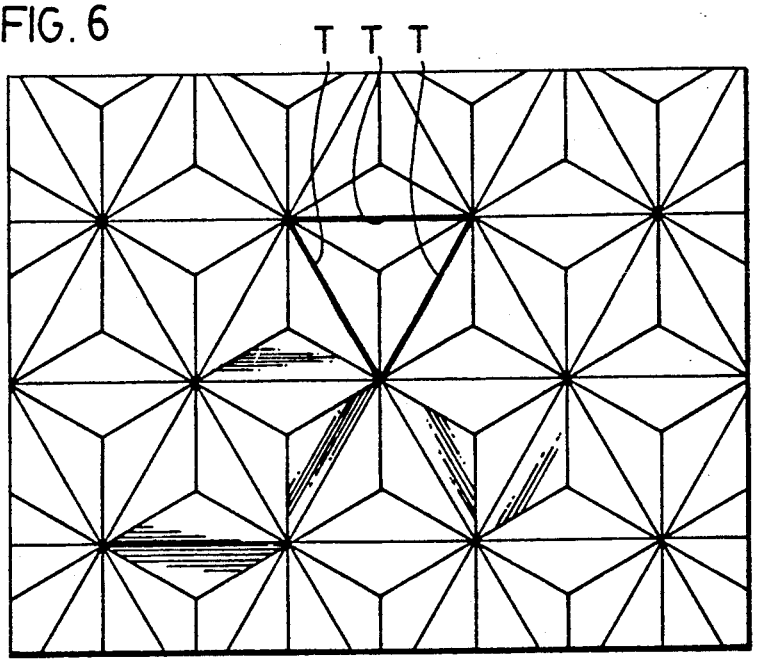
FIGS. 6-8 show the schematic arrangement of retroreflectant zones on a sheet.
Figure 8:
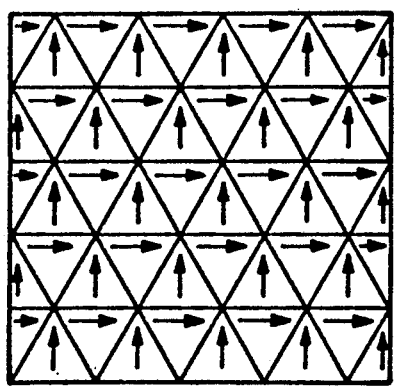
Figure 7:
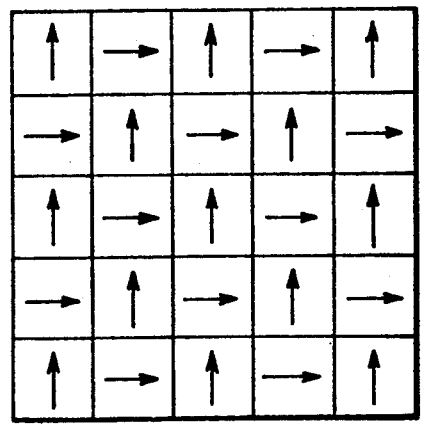

FIGS. 6-8 are taken from U.S. Pat. No. 4,202,600 previously referred to. In FIG. 6 the preferred retroreflective sheeting is schematically illustrated from the non-retroreflecting side. The array as oriented in FIG. 6 may be thought of as having an orientation corresponding to a horizontal directional arrow. As stated in U.S. Pat. No. 4,202,600 orientation of an array with an orientation as shown in FIG. 6 can be varied in a regularly alternating pattern, such as a checkerboard pattern, in a random pattern or in any other pattern that provides sufficient mixing of different orientations to give the sheet an appearance of uniform brightness when viewed at a high angle of incidence from the minimum.

FIGS. 7 and 8 show two preferred methods of combining arrays in zones with orientations at 90° to each other. Since the arrays have 60° symmetry (90°-60°=30°) each zone has its cube corner reflectors oriented at 30° to adjacent zones. The result is reflective sheeting which for retroreflected rays at 60° to the normal, has relatively even reflectivity at different azimuthal angles about the normal.

As previously stated the preferred sheeting having the arrangement of FIGS. 7 or 8 is Reflexite, AP1000 of the Reflexite Corporation. The zones are indistinguishable at normal minimum viewing distances.

So far as the dimensions of the corrugations are concerned these should have a center-to-center spacing of from 1/16" to ⅜ for the reasons previously set out.

I claim:

1. Reflectant surface composed of:
   a series of convex outward parallel ribs,
   said ribs having a center-to-center spacing of between ⅜" and 1/16",
   and an outer surface on said ribs of retroreflective material,
   said surface comprising an optically exposed plurality of reflectant cube corners arranged in triads, which are not individually distinguishable at minimum expected viewing distances, where triads of mutually perpendicular surfaces are each approximately symmetrical about a normal to the surface.

2. Reflectant surface as claimed in 1 wherein said triads are arranged in a plurality of zones, each zone contains such triads in orderly array, said zones are not visually distinguishable at minimum expected viewing distances.

3. Reflectant surface as claimed in claim 2 wherein orientation of the array of a zone is at 30° to the adjacent zones.

4. Reflectant surface device as claimed in claim 3 wherein the center-to-center spacing is about 5/16".

5. Reflectant surface as claimed in claim 3 wherein said reflecting surfaces are embodied in sheeting applied to a backing element.

6. Reflectant surface as claimed in claim 5 wherein the center-to-center spacing is about 5/16".

7. Reflectant surface as claimed in claim 1 wherein said reflecting surfaces are embodied in sheeting applied to a backing element.

8. Reflectant surface as claimed in claim 7 wherein the center-to-center spacing is about 5/16".

9. Reflectant surface as claimed in claim 1 wherein the center-to-center spacing is about 5/16".

10. Reflectant surface as claimed in claim 2 wherein the center-to-center spacing is about 5/16".

11. Reflectant surface composed of:
    a series of convex outward parallel ribs, said ribs having a center-to-center spacing of between ⅜" and 1/16", and
    an outer surface of the reflecting material sold under the trade mark REFLEXITE.

12. Reflectant surface as claimed in claim 11 wherein the reflecting material is embodied in sheeting applied to a backing element.

13. Reflectant surface as claimed in claim 11 wherein the center-to-center spacing is about 5/16".

14. Landing pylon comprising means for stably supporting on a support surface, an upwardly extending column, defining a vertical axis, said upwardly extending column being defined by a plurality of generally flat side panels sloping inwardly and upwardly at a predetermined angle to the vertical axis, said generally flat side panels being composed of a series of convex outward parallel ribs having center-to-center spacing of between ⅜" and 1/16", and
    an outer surface on said ribs of cube corner retro-reflective material.

15. Landing pylon as claim in claim 14 wherein said ribs extend in an upward-downward direction on said side panels.

16. Directional indicating reflector comprising a pair of planar retro-reflecting panels arranged at an included angle of approximately 60° to each other,
    wherein said planar retro-reflecting panels stop short of the line of intersection of the planes of the panel and a generally planar panel is provided joining rear edges of said retro-reflecting panels,
    said planar panel being composed of a series of convex parallel ribs having center-to-center spacing of between ⅜" to 1/16", and
    an outer surface on said ribs of cube corner retro-reflective material.

17. Reflector as claimed in claim 16 wherein said ribs extend parallel to the line of intersection of the planes of said retro-reflecting panels.

* * * * *